US008316461B2

(12) United States Patent  (10) Patent No.: US 8,316,461 B2
Chang et al.  (45) Date of Patent: *Nov. 20, 2012

(54) METHOD FOR SHARING RIGHTS OBJECTS BETWEEN USERS

(75) Inventors: Kyung-ah Chang, Seoul (KR); Byung-rae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/579,034

(22) Filed: Oct. 14, 2009

(65) Prior Publication Data

US 2010/0037051 A1 Feb. 11, 2010

Related U.S. Application Data

(63) Continuation of application No. 10/922,021, filed on Aug. 20, 2004, now Pat. No. 7,734,917.

(30) Foreign Application Priority Data

Aug. 21, 2003 (KR) .................. 10-2003-0057901

(51) Int. Cl.
*G06F 7/04* (2006.01)
*G06F 11/30* (2006.01)
*H04L 9/32* (2006.01)
*H04L 9/08* (2006.01)
*H04N 7/167* (2011.01)

(52) U.S. Cl. .................. 726/31; 726/2; 726/4; 726/27; 713/169; 713/170; 713/193; 380/201; 380/281; 380/283; 380/230

(58) Field of Classification Search .................. 713/167, 713/171, 170, 193, 169; 726/2, 4, 27, 31; 380/230, 201, 281, 283
See application file for complete search history.

(56) References Cited

U.S. PATENT DOCUMENTS

| 5,646,999 | A | * | 7/1997 | Saito .............................. 705/54 |
| 5,917,912 | A | | 6/1999 | Ginter et al. |
| 6,219,652 | B1 | | 4/2001 | Carter et al. |
| 6,237,786 | B1 | | 5/2001 | Ginter et al. |
| 6,895,503 | B2 | | 5/2005 | Tadayon et al. |
| 7,065,787 | B2 | | 6/2006 | Ganesan et al. |

(Continued)

FOREIGN PATENT DOCUMENTS

EP 0715247 A1 6/1996

(Continued)

OTHER PUBLICATIONS

Telecommunication Technologies, English Russian Exaplanatory Dictionary, Nevdyaev L.M., Moscow, The International Center of Scientific and Technical Information (ICST), 2002, [D1], p. 85.

(Continued)

*Primary Examiner* — Mohammad W Reza
(74) *Attorney, Agent, or Firm* — Sughrue Mion, PLLC

(57) ABSTRACT

Provided is a method for delivering all or part of a rights object (RO) of a user associated with the content to other users. The method includes creating a rights object to be transmitted to a second user within a limit of the rights object held by the first user, and forwarding the created rights object to the second user. The method allows each user to share its own RO with other users within the limit of the RO without server authentication.

5 Claims, 8 Drawing Sheets

U.S. PATENT DOCUMENTS

| | | |
|---|---|---|
| 7,134,026 B2 | 11/2006 | Horiuchi et al. |
| 7,222,104 B2 | 5/2007 | Tadayon et al. |
| 7,337,332 B2 * | 2/2008 | Tsuria et al. ............... 713/193 |
| 7,668,917 B2 * | 2/2010 | Netsch et al. ............... 709/206 |
| 2002/0147689 A1 * | 10/2002 | Falkner .......................... 705/52 |
| 2002/0152262 A1 | 10/2002 | Arkin et al. |
| 2002/0152393 A1 | 10/2002 | Thoma et al. |
| 2002/0183985 A1 | 12/2002 | Hori et al. |
| 2003/0004888 A1 | 1/2003 | Kambayashi et al. |
| 2003/0097655 A1 * | 5/2003 | Novak .......................... 725/31 |
| 2004/0003269 A1 | 1/2004 | Waxman et al. |
| 2004/0019801 A1 * | 1/2004 | Lindholm et al. ........... 713/200 |
| 2004/0235521 A1 * | 11/2004 | Pradhan et al. ............. 455/558 |
| 2005/0004875 A1 | 1/2005 | Kontio et al. |
| 2005/0120232 A1 | 6/2005 | Hori et al. |
| 2005/0154599 A1 | 7/2005 | Kopra et al. |
| 2005/0203848 A1 | 9/2005 | Van De Heuvel et al. |
| 2005/0277403 A1 | 12/2005 | Schmidt et al. |
| 2006/0173787 A1 | 8/2006 | Weber et al. |
| 2007/0027814 A1 | 2/2007 | Tuoriniemi |
| 2007/0271184 A1 | 11/2007 | Niebert et al. |
| 2008/0046505 A1 * | 2/2008 | Netsch et al. ............... 709/203 |

FOREIGN PATENT DOCUMENTS

| | | |
|---|---|---|
| EP | 1081577 A2 | 3/2001 |
| GB | 2370474 A | 6/2002 |
| JP | 06103058 A | 4/1994 |
| JP | 8263438 A | 10/1996 |
| JP | 11-328033 A | 11/1999 |
| JP | 2000099477 A | 4/2000 |
| JP | 2000207340 A | 7/2000 |
| JP | 2000-268242 B2 | 9/2000 |
| JP | 2002215828 A | 8/2002 |
| JP | 200358657 A | 2/2003 |
| JP | 2004517377 A | 10/2004 |
| KR | 20020034974 A | 5/2002 |
| WO | 9810381 A1 | 3/1998 |
| WO | 0039987 A1 | 7/2000 |
| WO | 0176294 A1 | 10/2001 |
| WO | 0206931 A2 | 1/2002 |
| WO | 0251057 A2 | 6/2002 |
| WO | 02056203 A1 | 7/2002 |
| WO | 02099560 A2 | 12/2002 |
| WO | 02101491 A2 | 12/2002 |
| WO | 03007213 A1 | 1/2003 |
| WO | 2004055650 A1 | 7/2004 |

OTHER PUBLICATIONS

"Digital Rights Management Version 1.0," Announcement Open Mobile Alliance, XX, XX, Sep. 5, 2002, pp. 1-21, XP002273196.

Yoshioka, et al., "The Technical Trend of Super Distribution" The Institute of Electronics Information and Communication Engineers, Technical Report of IEICE, ISEC 94-22 (Sep. 1994), 1999-00172-007.

Office Action dated Sep. 28, 2010 issued by the Japanese Patent Office in Japanese Patent Application No. 2004-222127.

Communication dated Nov. 29, 2011, from the Japanese Patent Office issued in counterpart Japanese Application No. 2010-293033.

* cited by examiner

FIG. 3A

```
<rights>
        ............
        <uid>cid:4567829547@foo.com</uid>
        ............
        <KeyValue>Cei4Qxjwo9Kg8D3pKgxw=</KeyValue>
        ............
  <permission>
    <play>
      <constraint>
        <count>10</count>
      </constraint>
    </play>
  </permission>
</rights>
```

FIG. 4A

| Modified RO for user A | RO created for user B |
|---|---|
| `<permission>`<br>　`<play>`<br>　　`<constraint>`<br>　　　`<count>10</count>`<br>　　`</constraint>`<br>　`</play>`<br>`</permission>`<br>`<permission>`<br>　`<move>`<br>　　`<constraint>`<br>　　　`<count>5</count>`<br>　　`</constraint>`<br>　`</move>`<br>`</permission>` | `<permission>`<br>　`<play>`<br>　　`<constraint>`<br>　　　`<count>5</count>`<br>　　`</constraint>`<br>　`</play>`<br>`</permission>` |

METHOD FOR SHARING RIGHTS OBJECTS BETWEEN USERS

This is a continuation of U.S. application Ser. No. 10/922,021, filed Aug. 20, 2004, which claims priority of Korean Patent Application No. 10-2003-0057901 filed on Aug. 21, 2003, respectively. The entire disclosures are hereby incorporated by reference.

BACKGROUND OF THE INVENTION

1. Field of the Invention

The present invention relates to a method for delivering all or part of a rights object (RO) to users.

2. Description of the Related Art

Currently, wireless Internet and communication technologies are rapidly advancing, and handheld or portable terminals with enhanced multimedia features are widely used in everyday life. A great number of additional features have been included with mobile phones. For example, monotone melody mobile phones are being replaced with 16-chord melody mobile phones and 32-chord melody mobile phones. More recently, mobiles phones providing 64-chord ring tones have been developed. Also, demand is increasing for mobile phone terminals with a digital camera. As these handheld or portable multimedia terminals have become increasingly sought after, industry fields or companies engaged in providing related contents or services, such as ringing sound downloads, ring back tones, entertainers' or characters' photos or pictures, and moving images such as movies and sports, are rapidly growing. In the past, content providing services were usually free of charge. However, the trend is changing toward charging for these services. At an early stage, a fundamental problem for content providers was extending their ability to prevent illegal copying of contents offered to users. To this end, the content providers and distributors have devised several mechanisms based on piracy prevention technology. Today, introduction of digital rights management (DRM) schemes that manage ROs flexibly and conveniently is growing.

While the DRM scheme has enabled encrypted content to be freely distributed to users, it prevents a recipient from executing the content before purchasing the RO associated with it. The freedom in distribution of content enables the users to forward the DRM content to friends or family who they want to share it with, thereby allowing for proliferation of high quality content, its distribution and advertising carried out by its users. In order to play the encrypted content, the recipient needs to have an RO associated with the content. In other words, the recipient is not allowed to execute the content forwarded from another user without purchasing the RO.

FIG. 1 shows a conventional process of distributing the DRM content.

A first user 101 receives encrypted content provided by a content provider 130 for execution. While the encrypted content can be freely transmitted and distributed, an RO associated with the content is needed to execute the same content. When the first user 101 requests (purchases) the RO from a rights issuer 100 in order to execute the content, the rights issuer 100 transmits the requested (purchased) RO to the first user 101 who is then entitled to execute the content and enjoy multimedia information contained therein.

Once the first user 101 is satisfied with the content as the result of executing the same and wants to share the content with a friend who is a second user 102, the first user 101 forwards the same content to the second user 102. The second user 102 needs an RO to execute the encrypted content received from the first user 101. The second user 102, holding no RO associated with the content, requests the rights issuer 100 to transmit the RO for execution. The second user 102 can receive the desired content directly from the content provider 300 as well as from the first user 101.

The conventional DRM approach shown in FIG. 1 cannot allow a service user to share a rights object needed to execute the content with another user. To address this problem, Japanese Patent Laid-open Publication No. 2003-58657 has proposed a method for sharing a license to use the content with another user that involves the following:

1. Storing information on a content license in a private area of license information database for each user or terminal;

2. Upon request for transfer from an assignor, creating an encryption key, encrypting information on a license to be transferred using the encryption key, moving the encrypted information from private area to public area, and issuing the encryption key to the assignor;

3. Delivering the issued encryption key from the assignor to an assignee;

4. Upon request of the assignee to transfer the license, authenticating the assignee by checking whether he/she has the encryption key that has been issued to the assignor; and 5. Upon this authentication, decrypting the information on the license to be transferred with the encryption key and moving the decrypted information from the public area to a private area for the assignee.

The proposed approach makes it possible for a user holding a license to execute content to transfer the license to another user. In other words, the user is allowed to share the license for the owned content with others.

In the conventional approach, however, a content license is supposed to be managed by a content provider and a server of the same, and the information on the license resides only in the server. In other words, the server must be involved in sharing the license among users. Furthermore, upon request for transfer from the assignor, the server pre-authenticates the request. That is, to transfer the license for the content to the assignee, the assignor receives an appropriate encryption key from the server and delivers the same to the assignee. The assignee is then authenticated with the encryption key for use of the content. In this way, the conventional approach requires a complicated process for transferring the license.

SUMMARY OF THE INVENTION

The present invention provides a method for freely transmitting and sharing a rights object (RO), needed to execute specific content, between users.

According to an aspect of the present invention, there is provided a method for sharing rights objects associated with content, the method comprising creating a rights object to be transmitted to a second user within a limit of the rights object held by a first user, the rights object issued by a rights issuer or received from another user, and the first user forwarding the created rights object to the second user. Preferably, the method further comprises encrypting the rights object using a public key of the second user before transmission of the rights object. Also, the first and second users preferably transmit information on the limits of the rights objects held by themselves to the rights issuer at every predetermined period.

Backing up the RO for the user on a backup server not only ensures rapid recovery in case of loss or failure of a portable terminal but also can reduce the processing load of the terminal.

BRIEF DESCRIPTION OF THE DRAWINGS

The above and other features and advantages of the present invention will become more apparent by describing in detail exemplary embodiments thereof with reference to the attached drawings in which:

FIG. 3A illustrates a document format of the RO shown in FIG. 2;

FIG. 4A illustrates document formats of an RO created by modifying the RO for other users;

DETAILED DESCRIPTION OF THE INVENTION

Preferred embodiments of the present invention will now be described in detail with reference to the accompanying drawings.

Figure 1:
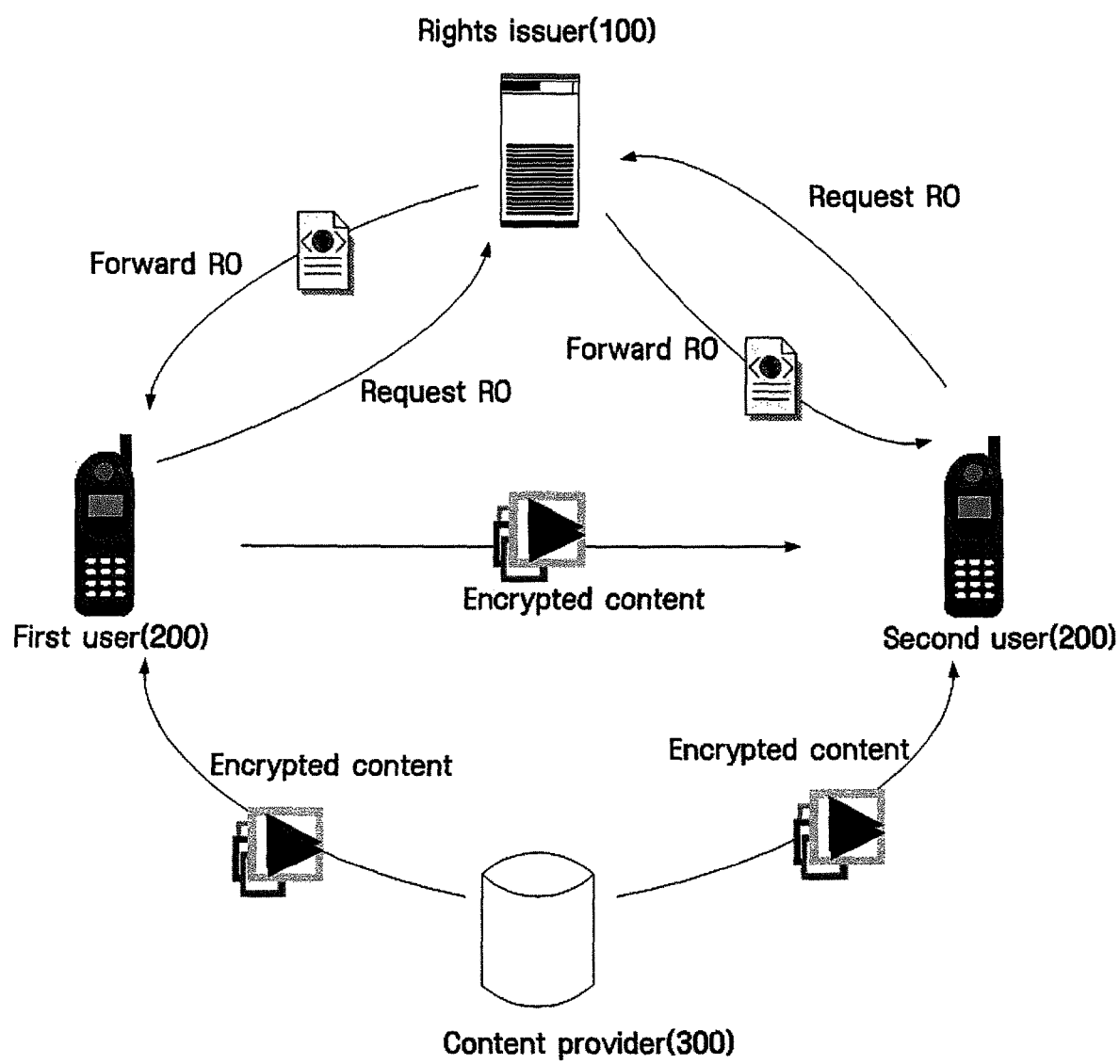
FIG. 1 illustrates a conventional process of distributing content in a digital rights management (DRM) format.
Figure 2:
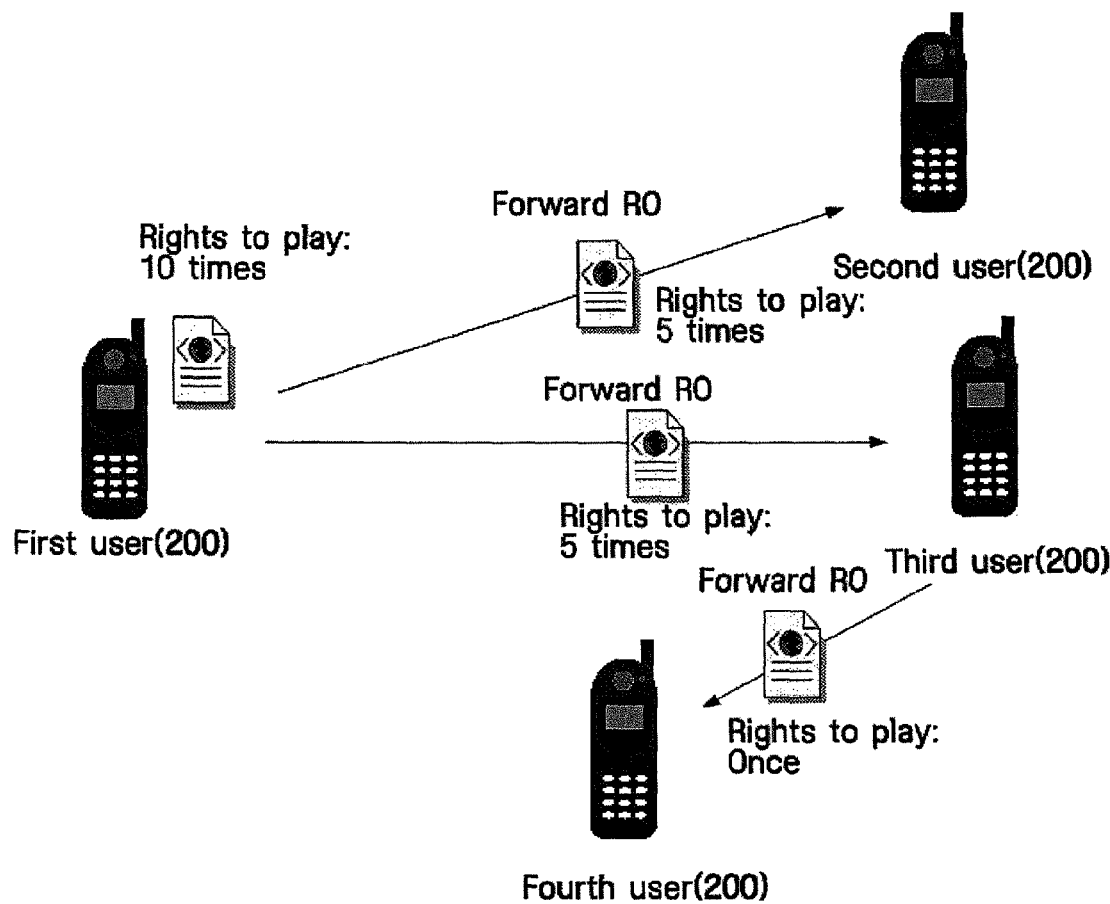
FIG. 2 illustrates a process of creating and distributing a rights object (RO) needed to execute DRM content according to an embodiment of the present invention.

FIG. 2 illustrates a process of creating and distributing a rights object (RO) needed to execute DRM content according to an embodiment of the present invention.

Referring to FIG. 2, a first user 201 possesses a rights object (RO) issued by a rights issuer. The RO currently held by the first user 201 represents rights to play encrypted content for a predetermined number of times. A non-limiting example is described whereby rights to play encrypted content up to 10 times may be granted. When the first user 201 shares the RO containing the play rights with friends, i.e. second and third users 202 and 203, the second and third users 202 and 203 are allowed to play the encrypted content. That is, the first user 201 creates ROs that specifies rights to play 5 times and rights to play 3 times based on the RO defining the rights to play up to 10 times. Thus, the first user 201 is allowed to play the content twice. The created ROs are forwarded to the second and third users 202 and 203, respectively. In a preferred embodiment, the ROs representing the rights to play 5 times and 3 times are encrypted using public keys of the recipients (second and third users 202 and 203) and forwarded to the second and third users 202 and 203, respectively, which in turn decrypt the encrypted ROs using their secret keys. Forwarding the encrypted ROs prevents an unauthorized third party from using the ROs. Preferably, the ROs are electronically signed with a secret key of the sender (first user 201) for transmission, which prevents forgery, tampering, and denial of transmission at the sending side.

Once the third user 203 has been satisfied with the result after playing the encrypted content using the RO received from the first user 201, the third user 203 creates an RO representing rights to play once based on the RO representing rights to play twice and forwards the created RO to a fourth user 204. The RO must be electronically signed and encrypted before transmission.

The RO in the present invention is not limited to a play count but may contain play duration. In this case, a new RO is created by dividing the play duration into several parts, which is constructed as being included in the present invention.

Figure 3B:
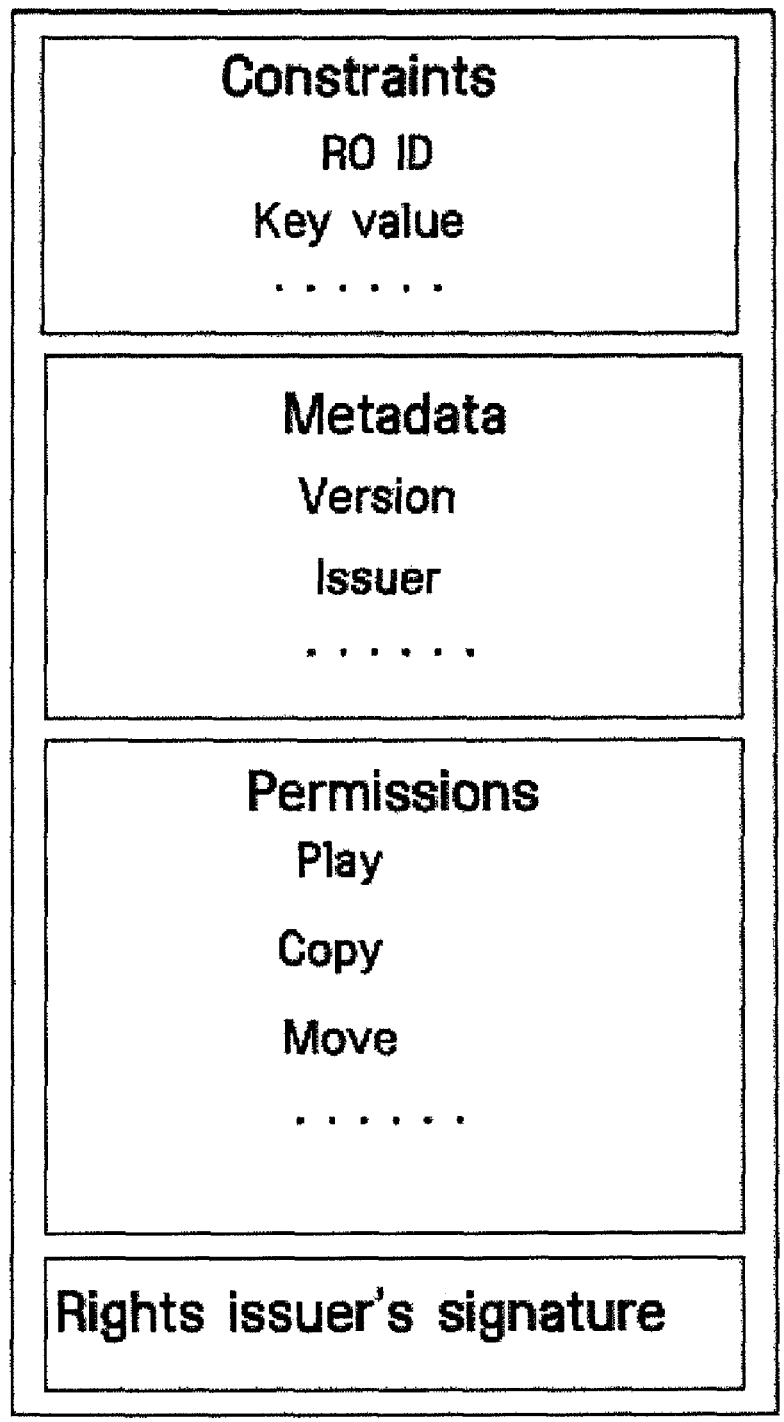
FIG. 3B illustrates a document structure of the RO shown in FIG. 2.

FIGS. 3A and 3B illustrate a document format and structure of the RO shown in FIG. 2. Referring to FIG. 3A, <rights> contains <uid> and <KeyValue> which specify a contents object ID (cid) of the RO and a key value with which the content is encrypted, respectively. <permission> contains various permissions <play>, <copy>, and <move> to play, copy, and move the content, respectively, each being restricted by <constraint>. For example, <constraint> for permission <play> may be <count> that means the number of times the content is played, <duration> that means the time during which the content is played, and <datetime> that means a certain date or time after which permission <play> expires. In FIG. 3A, <constraint> is the play count of 10.

FIG. 3B shows an example of a document structure of the RO. Referring to FIG. 3B, the RO includes constraints, metadata, permissions, and a rights issuer's signature. The constraints contain ID of the RO and key value, the metadata contains information on version and issuer of the RO. The permissions contain various permissions to play, copy, and move the content, and the rights issuer's signature indicates an entity that issues the appropriate RO.

Figure 4B:
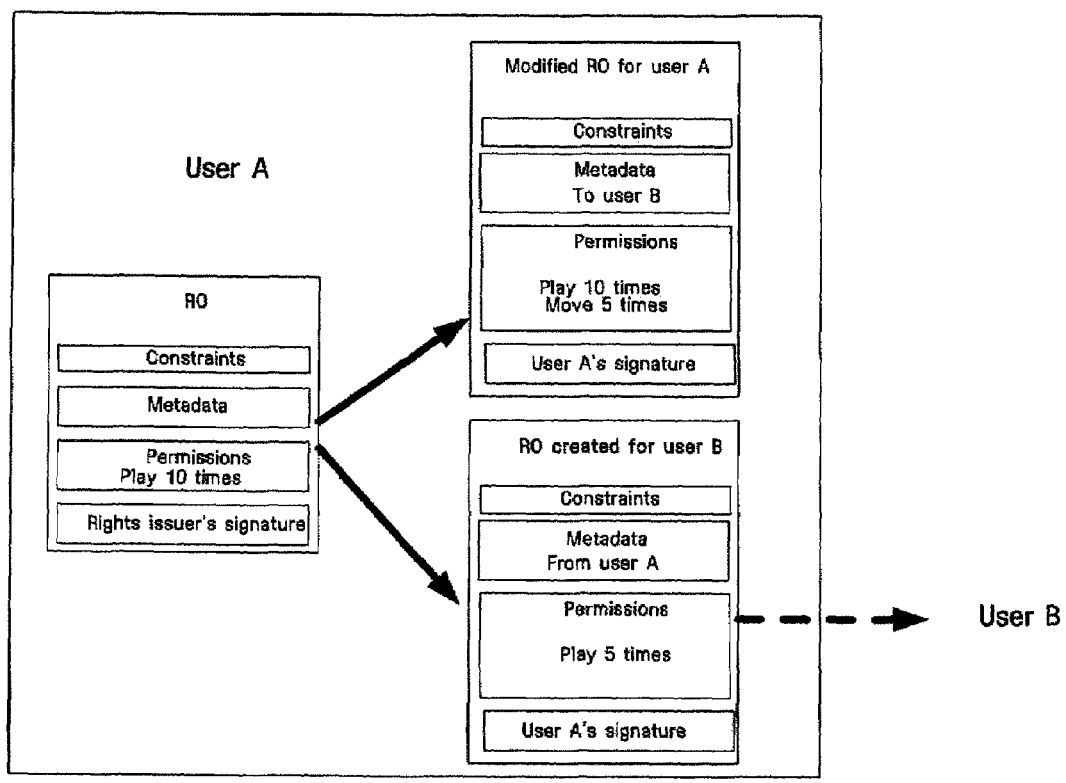
FIG. 4B illustrates document structures of an RO created by modifying the RO for other users.

FIGS. 4A and 4B illustrate document formats and structures of an RO created by modifying the RO for other users. Referring first to FIG. 4B, user A holds an RO issued by an appropriate rights issuer. Based on the permissions defined in the RO, which are rights to play the appropriate content up to 10 times, the user A creates an RO representing rights to play 5 times in order to move the created RO to user B. In this case, in addition to the RO issued by the rights issuer, the user A creates an RO representing the rights to play 10 times as well as movement of the rights to play 5 times in order to specify the modifications made by the user A during subsequent periodic data transmission with the rights issuer. Metadata of the modified RO specifies that the RO has been created for user B, and permissions specify that the rights to play 5 times have been moved. Lastly, the user A signs the appropriate column to indicate that they themselves have made the modifications. On the other hand, metadata of the RO created for the user B specifies that the RO has been received from the user A, and permissions indicate the rights to play 5 times. Lastly, a signature is made to indicate that the RO has been created by the user A. The RO created for the user B is forwarded to the user B and content is executed within constraints imposed on the permissions defined in the RO.

FIG. 4A illustrates document formats of an RO created for user B, as shown in FIG. 4B, and the modified RO for user A. The modified RO contains a new permission <move> specifying movement of the rights to play 5 times, user A's signature, and other information. The RO created for the user B specifies the rights to play 5 times, user A's signature and other information.

Figure 5:
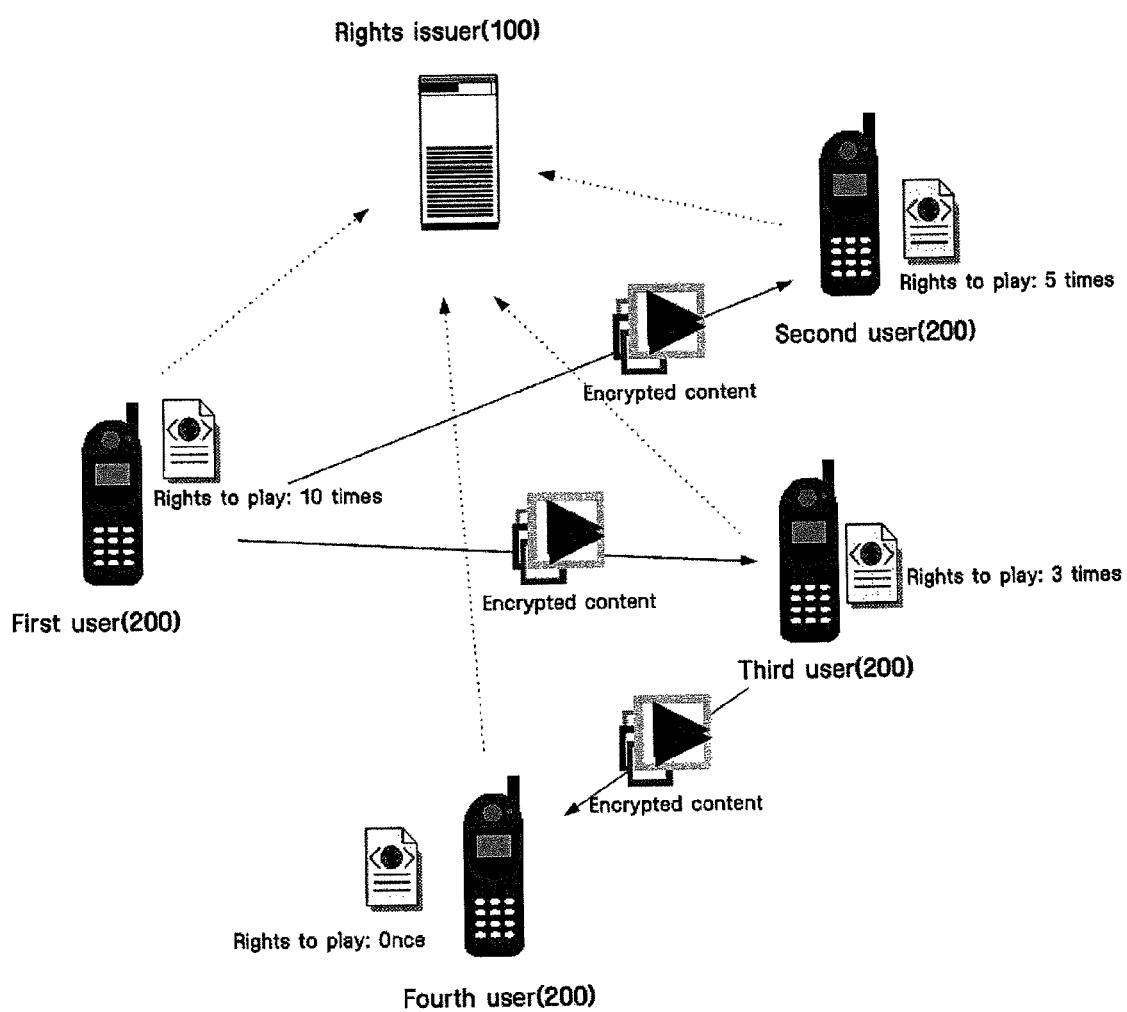
FIG. 5 illustrates a process of creating, distributing, and managing an RO needed to execute DRM content according to another embodiment of the present invention.

FIG. 5 illustrates a process of creating, distributing, and managing an RO needed to execute content in a digital rights management (DRM) format according to another embodiment of the present invention.

A first user 501 holds an RO specifying rights to play the content up to 10 times. The first user 501 creates two ROs representing rights to play 5 times and rights to play 3 times and transmits the same to second and third users 502 and 503, respectively. As a result, the remaining RO currently held by the first user 501 contains rights to play the content twice. When the third user 503 creates an RO representing rights to play once and forwards the RO to a fourth user 504, the remaining RO held by the third user 503 contains rights to play the content twice.

However, the first or third users 501 and 503 may create an RO beyond the limit of the rights to play defined in the RO held by themselves, or forward a legally created RO to many users at a time i.e. by tampering with software with malicious intent. To prevent the illegal use of ROs held by the users, the ROs must be transmitted to a rights issuer 500 at regular time intervals. For example, the users may forward their own ROs to the rights issuer 500 each time a new RO is created or at predetermined time intervals (e.g. every week or fifteen days).

When the RO is forwarded after a long period of time, there may be a discrepancy between the limit of the RO held by each user and that held by the rights issuer. Occurrence of this discrepancy is closely related to a period with which the RO is transmitted to the rights issuer 500. That is, as the period increases, a traffic load decreases, but possibility of discrepancies increase. As the period decreases, the traffic load increases, but possibility of discrepancies decrease.

It is preferable to encrypt the created RO using a public key of a recipient. Each user can transmit the encrypted content or an address or Uniform Resource Locator (URL) where the encrypted content is located to other users together with the RO associated with the content.

Figure 6:
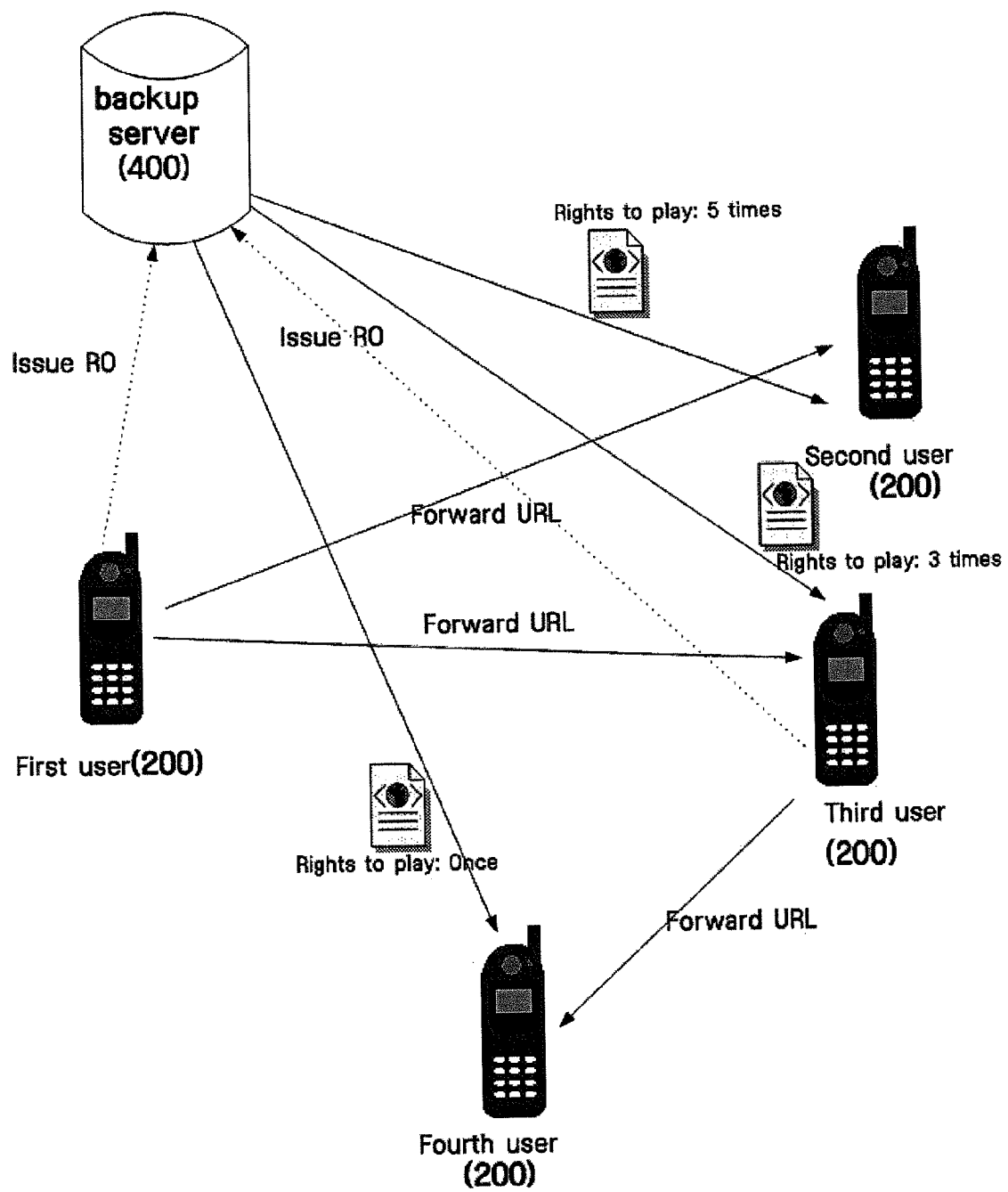
FIG. 6 illustrates a process of creating and distributing an RO needed to execute DRM content according to another embodiment of the present invention.

FIG. 6 illustrates a process of creating and distributing an RO needed to execute DRM content according to another embodiment of the present invention. A first user 601 can store an RO issued by a rights issuer in a backup server 640 connected via a wireless or wired network. As described above with references to FIGS. 2 and 5, the first user 601 can directly create the RO and forward the RO to second or third users 602 and 603. However, in the illustrative embodiment, the backup server 640 creates ROs for transmission to second and third users 602 and 603 in order to reduce an excessive computational burden of electronic signature and encryption. That is, the backup server 640 creates the respective ROs for the second and third users 602 and 603 based on the RO of the first user 601 stored thereon. The created ROs are subjected to electronic signature and encryption. The backup server 640 receives a secret key of the first user 601 for electronic signature and public keys of the second and third users 602 and 603 for encryption from the first through third users 601-603 and performs the electronic signature and encryption on each RO using these keys.

Meanwhile, the first user 601 forwards an address or URL of the backup server 640 to the second and third users 602 and 603 so that the second and third users 602 and 603 can download the created RO from the backup server 640. Here, the first user 601 does not necessarily forward the address of the backup server 640 but may instead receive the ROs for the second and third users 602 and 603 from the backup server 640 and then transmit the same to the second and third users 602 and 603, respectively.

The second or third users 602 and 603 may directly use the received RO or back-up the same in the backup server 640 like the first user 601. The third user 603 may create an RO for a fourth user 604 through the backup server 640 within the limit of an RO held by itself.

Meanwhile, since the first user 601 used its play rights 8 times from among 10 times, the first user 601 currently has the rights to play the encrypted content twice. After the first user 601 again has played the content, rights to play twice have been backed up within the backup server 640 whereas the first user 601 currently holds the rights to only play once more. This discrepancy can be solved by automatically backing up a play count of the first user 601 in the backup server 640 when the first user 601 accesses the backup server 640 and there is a discrepancy in the play count.

According to the present invention, users are allowed to share their ROs with other users within the limits of the ROs without server's authentication.

Furthermore, the present invention ensures safe use of the purchased RO using a backup server for backup of the RO. When a memory or processor of a terminal does not have sufficient capacity to create an RO, the present invention can solve this problem using the backup server.

Although the present invention has been particularly shown and described with reference to preferred embodiments thereof, it will be understood by those of ordinary skill in the art that various changes in form and details may be made therein without departing from the spirit and scope of the present invention as defined by the following claims. Therefore, it is to be understood that the above described embodiments are for purposes of illustration only and not to be construed as a limitation of the invention. The scope of the invention is given by the appended claims, rather than the preceding description, and all variations and equivalents which fall within the range of the claims are intended to be embraced therein.

What is claimed is:

1. A method for sharing rights objects associated with content, the method comprising:

creating, with a first terminal by a first user, a rights object to be transmitted to a second user within a limit of a rights object held by the first user, the rights object held by the first user issued by a source rights issuer or received from another user;

encrypting the created rights object;

forwarding the created rights object from the first user to the second user without interacting with an intermediary, and transmitting, by the first and second users, information on the limits of the rights objects each hold to the source rights issuer at a predetermined period.

2. The method of claim 1, further comprising encrypting the rights object using a public key of the second user before transmission of the rights object.

3. The method of claim 1, further comprising electronically signing the created rights object with a secret key of the first user before transmission of the rights object.

4. The method of claim 3, further comprising encrypting the rights object using a public key of the second user before transmission of the rights object.

5. The method of claim 1, wherein the first user retains a remaining rights object within the limit of the rights object not transmitted to the second user.

* * * * *